United States Patent
Cunningham et al.

(10) Patent No.: US 6,662,557 B1
(45) Date of Patent: Dec. 16, 2003

(54) HYDROSTATIC TRAVELING MECHANISM

(75) Inventors: Sinclair Cunningham, Kirkcaldy (GB); Graham Perry, Scotland (GB)

(73) Assignee: Bosch Rexroth AG, Lohr am Main (DE)

( * ) Notice: Subject to any disclaimer, the term of this patent is extended or adjusted under 35 U.S.C. 154(b) by 0 days.

(21) Appl. No.: 10/018,264

(22) PCT Filed: Jun. 7, 2000

(86) PCT No.: PCT/EP00/05264

§ 371 (c)(1),
(2), (4) Date: May 8, 2002

(87) PCT Pub. No.: WO00/77426

PCT Pub. Date: Dec. 21, 2000

(30) Foreign Application Priority Data

Jun. 11, 1999 (DE) .......................... 199 26 718
Apr. 11, 2000 (DE) .......................... 100 17 901

(51) Int. Cl.7 ............................................. F16H 61/40
(52) U.S. Cl. ............................ 60/425; 60/484; 60/486
(58) Field of Search ......................... 60/425, 484, 486; 180/197, 341, 345, 347

(56) References Cited

U.S. PATENT DOCUMENTS

| 3,595,334 | A | * | 7/1971 | Issac | 60/426 |
| 4,261,431 | A | * | 4/1981 | Hawbaker | 60/484 |
| 5,730,041 | A | | 3/1998 | Fillion et al. | |

FOREIGN PATENT DOCUMENTS

| DE | 2 026 910 | 12/1971 |
| DE | 3 107 991 A1 | 9/1982 |
| EP | 0 347 804 A1 | 12/1989 |
| EP | 0 378 742 A3 | 7/1990 |
| EP | 0 378 742 A2 | 7/1990 |
| EP | 0 505 254 B1 | 9/1992 |
| EP | 0 505 254 A1 | 9/1992 |
| EP | 0 547 947 B1 | 6/1993 |
| EP | 0 547 947 A1 | 6/1993 |
| EP | 0 919 417 A1 | 6/1999 |
| FR | 1 110 215 | 2/1956 |
| FR | 1 362 444 | 9/1964 |
| JP | 10-166883 | 6/1998 |
| WO | WO 91/01899 | 2/1991 |

* cited by examiner

*Primary Examiner*—Edward K. Look
*Assistant Examiner*—Igor Kershteyn
(74) *Attorney, Agent, or Firm*—Scully, Scott, Murphy & Presser

(57) ABSTRACT

The invention relates to a hydrostatic traveling mechanism (1) which comprises a hydraulic pump (4), a first hydraulic engine (8) that is linked with the hydraulic pump (4) via a hydraulic work circuit (2) and that drives a first drive train (17). The traveling mechanism further comprises a second hydraulic engine (10) that is linked with the hydraulic pump (4) via a hydraulic work circuit (2) and that drives a second drive train (19). The inventive traveling mechanism is also provided with a third hydraulic engine (23) that is coupled with the first drive train (17) and a fourth hydraulic engine (24) that is coupled with the second drive train (19). The third hydraulic engine (23) and the fourth hydraulic engine (24) are linked with each other via a hydraulic secondary circuit (3) that is independent of the work circuit (2).

19 Claims, 6 Drawing Sheets

HYDROSTATIC TRAVELING MECHANISM

BACKGROUND OF THE INVENTION

1. Field of the Invention

The invention relates to a hydrostatic drive for driving various types of vehicles.

2. Discussion of the Prior Art

A hydrostatic drive according to the precharacterising clause of Claim 1 is known from EP 0 547 947 A1. In the case of the hydrostatic drive disclosed in this publication, two vehicle wheels lying opposite on a vehicle axle are driven in each case by two hydraulic motors arranged in pairs on a common shaft. The hydraulic fluid delivered in a working circuit by a hydraulic pump branches upstream of the hydraulic motors arranged in pairs. Whereas the hydraulic fluid from the outlet of one of the two hydraulic motors arranged in pairs flows back directly to the hydraulic pump, the outlet of the other hydraulic motor arranged on the same shaft is connected to the hydraulic pump via a further hydraulic motor in each case, these further hydraulic motors driving vehicle wheels of another vehicle axle. In the case of the hydrostatic drive disclosed in this publication, no measures are provided to prevent a slip occurring at one of the mutually opposite vehicle wheels which considerably reduces the efficiency of the drive.

EP 0 505 254 A1 discloses a hydrostatic drive in which all the hydraulic motors driving different vehicle wheels are connected in parallel to the hydraulic pump. Speed sensors are provided on the output shafts of the individual hydraulic motors. As a function of the speeds determined at the individual output shaft, the amount of pressure fluid flowing through the assigned hydraulic motors can be regulated by adjustable, throttled branch valves, so that possible speed differences are equalised and in particular steering or exact straight-line driving permitted. However, this arrangement has only limited use for equalising a slip at one of the vehicle wheels.

EP 0 378 742 A2 discloses a hydrostatic drive in which a first and second drive train are completely separated from each other on cornering, the first drive train having a first hydraulic pump and a first hydraulic motor and the second drive train having a second hydraulic pump and a second hydraulic motor. In order to permit as exact a straight-line driving as possible, the hydraulic motors can be mechanically connected to each other on the one hand by means of a mechanical coupling on straight-line driving. On the other hand, the separated hydraulic working circuits are hydraulically connected to each other by valves on straight-line driving. A measure for preventing the slip at one of the two drive trains is not disclosed in this publication.

DE-A 20 26 910 discloses the arrangement of a first hydraulic pump, a first hydraulic motor, a second hydraulic pump and a second hydraulic motor in series in a common working circuit. Although in the case of this drive a slip is largely avoided owing to the hydraulic rigid coupling between the two hydraulic motors, the efficiency of this kind of drive is substantially reduced owing to the series arrangement of the two hydraulic motors.

SUMMARY OF THE INVENTION

The object on which the invention is based is to provide a hydrostatic drive for driving a plurality of drive trains, in which a slip at one of the drive trains is prevented without substantially reducing the efficiency.

The invention is based on the finding that it is advantageous to provide two hydraulic motors mechanically coupled to each other on each drive train, in each case one of the hydraulic motors being arranged in a working circuit and serving for the direct drive of the assigned drive train, whereas the other two hydraulic motors are hydraulically connected to each other via a secondary circuit. If a slip occurs at the first drive train, the associated hydraulic motor arranged in the secondary circuit works as a pump and generates a braking pressure in the secondary circuit. Since the speed of the hydraulic motor, arranged in the secondary circuit, of the second drive train is limited, the braking pressure built up in the secondary circuit reduces the speed at the first drive train. This avoids a situation where the slip occurring at the first drive train uses an excessively large amount of pressure fluid in the working circuit. The hydraulic power of the working circuit can therefore act undiminished on the second drive train which is not subjected to a slip.

Advantageous developments of the invention are specified in the subclaims.

Advantageously, switching valves are arranged in the secondary circuit in such a way that two of the hydraulic motors arranged in pairs on the drive trains are hydraulically interconnected in the secondary circuit, in the manner described above, only when a slip actually occurs. As long as no slip occurs, these hydraulic motors are, in contrast, connected via the switching valves to the working circuit, so that the output torque increases. The switching valves can be driven, for example, electrically via a control unit which determines the occurrence of a slip for example by a comparison of the drive-train speeds detected by means of speed sensors or by detection of a pressure drop at the hydraulic motors situated in the working circuit.

The hydraulic fluid can be fed into the secondary circuit by direct connection to a feed line via appropriate nonreturn valves. Alternatively, it is possible to use the low pressure of the working circuit as feed pressure for the secondary circuit. The feed is then expediently effected via a suitable switching valve for the pressure change.

The invention is also suitable for three, four or more drive trains. In this case, each drive train has two hydraulic motors, in each case one hydraulic motor being connected to the working circuit and another to the secondary circuit. It is also possible to provide a plurality of secondary circuits. The lines of the secondary circuit can be connected via a throttle, as a result of which a limited slip is allowed between the drive trains and thus the steering of the vehicles is facilitated.

BRIEF DESCRIPTION OF THE ACCOMPANYING DRAWINGS

The invention is described in more detail below with reference to the drawing, in which.

DETAILED DESCRIPTION OF THE PREFERRED EMBODIMENTS

Figure 1:
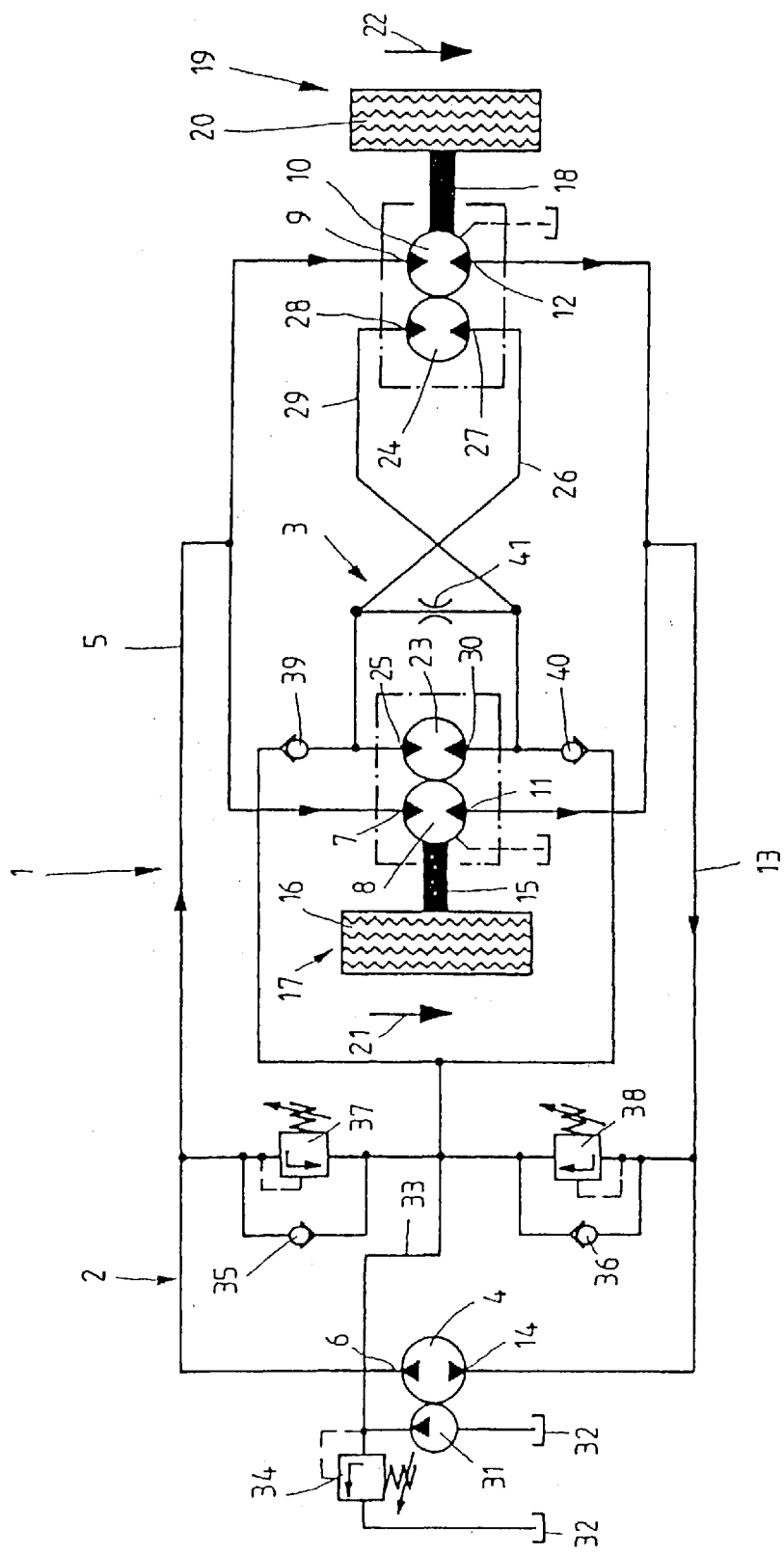
FIG. 1 shows a basic hydraulic circuit diagram of a first exemplary embodiment of the invention.

FIG. 1 shows a basic hydraulic circuit diagram of a first exemplary embodiment of the invention. The hydrostatic drive 1 according to the invention consists of a working circuit 2 and a secondary circuit 3. A preferably adjustable and reversible hydraulic pump 4 is arranged in the working circuit 2. A first connection 6 of the hydraulic pump 4 is connected via a first working line 5 to a first connection 7 of a first hydraulic motor 8. Furthermore, the first connection 6 of the hydraulic pump is connected via the first working line 5 to a first connection 9 of a second hydraulic motor 10. A second connection 11 of the first hydraulic motor 8 and a second connection 12 of the second hydraulic motor 10 are connected via a second working line 13 to a second connection 14 of the hydraulic pump 4.

The first hydraulic motor 8 is connected via a first output shaft 15 to a first drive train 17, which comprises a first vehicle wheel 16 in the exemplary embodiment illustrated. The second hydraulic pump 10 is connected via a second output shaft 18 to a second drive train 19, which comprises a second vehicle wheel 20 in the exemplary embodiment illustrated. The vehicle wheels 16 and 20 are opposite vehicle wheels of a common vehicle axle in the exemplary embodiment. The arrows 21 and 22 indicate the direction of rotation of the vehicle wheels 16 and 20. The hydraulic motors 8 and 10 do not necessarily have to drive opposite vehicle wheels of a common vehicle axle. The drive trains 17 and 19 may also be used for example to drive two tracks of a tracked vehicle.

A third hydraulic motor 23 is mechanically coupled to the first drive train 17. In contrast, a fourth hydraulic motor 24 is mechanically coupled to the second drive train 19. The first hydraulic motor 8 and the third hydraulic motor 23 are preferably arranged on the common output shaft 15 as double hydraulic motors. In the same way, the second hydraulic motor 10 and the fourth hydraulic motor 24 are preferably arranged on the common second output shaft 18 as double hydraulic motors.

The third hydraulic motor 23 and the fourth hydraulic motor 24 are hydraulically interconnected by the secondary circuit 3 in such a way that a first connection 25 of the third hydraulic motor 23 is connected via a first secondary line 26 to a first connection 27 of the fourth hydraulic motor 24 and a second connection 28 of the fourth hydraulic motor 24 is connected via a second secondary line 29 to a second connection 30 of the third hydraulic motor 23. The secondary circuit 3 is thus designed as a closed hydraulic circuit independent of the working circuit 1.

To feed hydraulic fluid both into the working circuit 1 and into the secondary circuit 3, use is made of a feed pump 31 which is coupled to the hydraulic pump 4 and which draws pressure fluid from a tank 32 and feeds it into a feed line 33. To limit the pressure in the feed line 33, use is made of a pressure-limiting valve 34 which connects the feed line 33 to the tank 32.

The feed line 33 is connected via a first nonreturn valve 35 to the first working line 5 and via a second nonreturn valve 36 to the second working line 13. The pressure fluid is thus fed in each case into that respective working line 5 or 13 which is carrying low pressure at the time. Arranged parallel to the nonreturn valves 35 and 36 are pressure-limiting valves 37 and 38 in order to limit the pressure in the respective working line 5 or 13 carrying high pressure at the time.

The first secondary line 26 is connected via a third nonreturn valve 39 to the feed line 33, whereas the second secondary line 29 is connected via a fourth nonreturn valve 40 to the feed line 33. As a result, hydraulic fluid is fed into the respective secondary line 26 or 29, carrying low pressure at the time, of the secondary circuit 3.

The hydrostatic drive 1 according to the invention works as follows:

When neither the drive train 17 nor the drive train 19 is subjected to a slip, the first hydraulic motor 8 and the second hydraulic motor 10 receive substantially the same amount of pressure fluid, so that the vehicle wheels 16 and 20 of the two drive trains 17 and 19 rotate at substantially the same speed. Consequently, the third hydraulic motor 23 and the fourth hydraulic motor 24 also rotate at substantially the same speed, so that no braking pressure is built up in the secondary circuit 3.

If, however, the first drive train 17 for example is subjected to a slip, in that the vehicle wheel 16 spins on a surface with poor grip, the speed of the vehicle wheel 16 would increase considerably without the measure according to the invention, since the vehicle wheel 16 encounters no resistance. The increased speed would increase the amount of pressure fluid flowing to the hydraulic motor 8, so that the pressure fluid flows substantially via the first hydraulic motor 8 and only to a far lesser extent via the second hydraulic motor 10 and thus the drive via the second drive train 19 would be less effective.

According to the invention, the drive trains 17 and 19 are, however, hydraulically connected to each other by the third hydraulic motor 23 and the fourth hydraulic motor 24 via the secondary circuit 3. The increase in the speed at the first output shaft 15 leads to an increase in the speed of the third hydraulic motor 23, which works as a pump and builds up a braking pressure either in the first secondary line 26 or the second secondary line 29 depending on the direction of rotation of the vehicle wheel 16. Since the speed of the fourth hydraulic motor 24 and hence the amount of pressure fluid flowing through this hydraulic motor 24 is determined by the speed of the vehicle wheel 20 which is in firm engagement with the surface, the fourth hydraulic motor 24 is not accelerated by the braking pressure, but rather the speed of the third hydraulic motor 23 and thus the speed of the first output shaft 15 adapts to the speed of the second output shaft 18. A substantially uniform distribution of the volumetric flow flowing in the working circuit 2 between the first hydraulic motor 8 and the second hydraulic motor 10 is therefore preserved and the drive via the second drive train 19 remains effective.

The first secondary line 26 and the second secondary line 29 of the secondary circuit 3 can be connected to each other via a throttle 41. The throttle 41 permits a throttled crossflow between the first secondary line 26 and the second secondary line 29 and thus a slight, limited slip between the vehicle wheels 16 and 20. As a result, the steering of the vehicle is permitted or facilitated.

Figure 2:
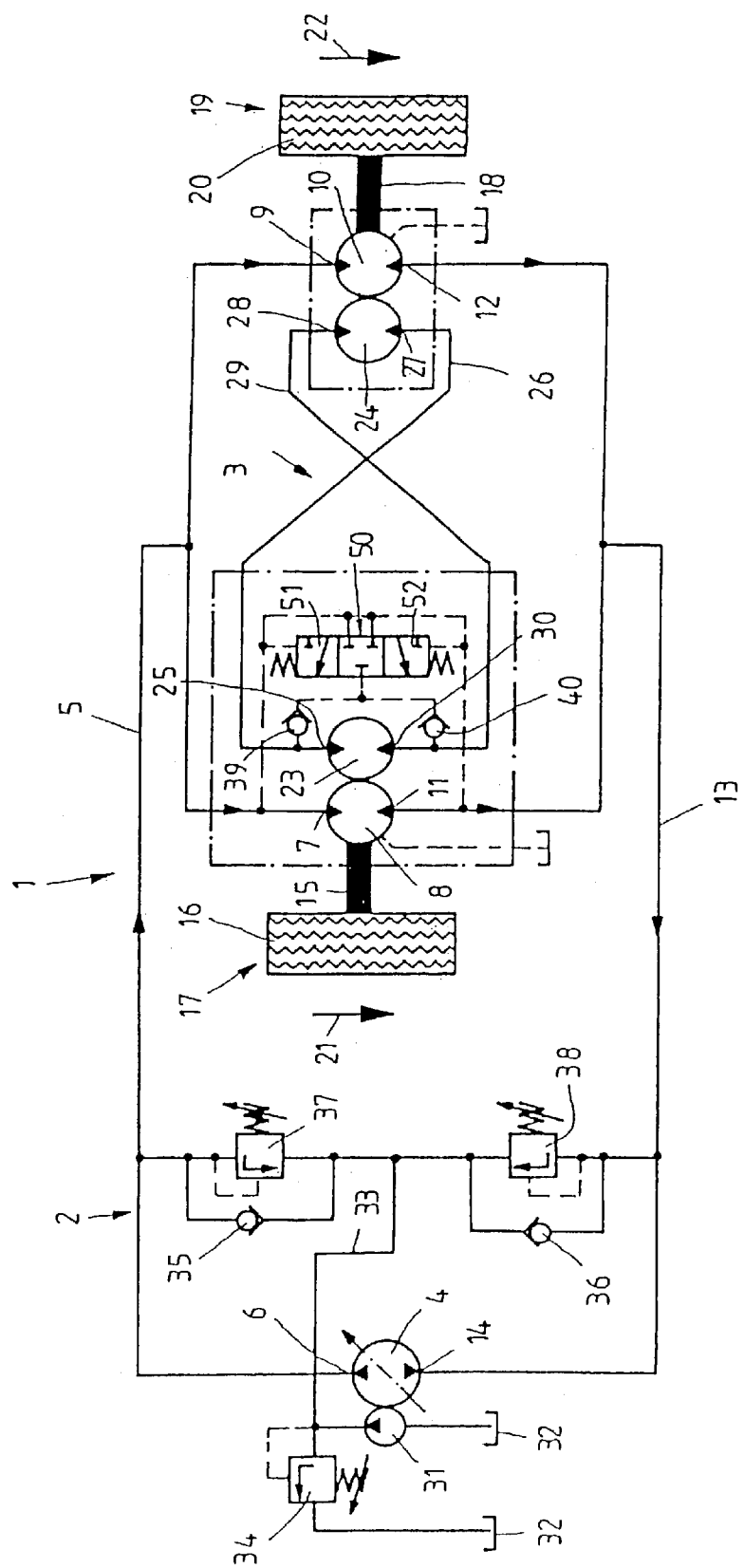
FIG. 2 shows a basic hydraulic circuit diagram of a second exemplary embodiment of the invention.

FIG. 2 shows a second exemplary embodiment of the hydrostatic drive 1 according to the invention. In all the figures of the drawing, elements which are identical or correspond to each other are provided with the same reference symbols, so that repeated description in this regard is unnecessary.

The difference from the exemplary embodiment already described with reference to FIG. 1 consists, in the case of the exemplary embodiment illustrated in FIG. 2, in that the nonreturn valves 39 and 40 for feeding the hydraulic fluid into the respective secondary line 26 or 29 carrying low pressure at the time are connected via a pressure-controlled 3/3-way switching valve 50 to the respective working line 5 or 13 carrying low pressure at the time. The valve 50 is in connection both with the first working line 5 and with the second working line 13 and compares the pressures prevailing in the working lines 5 and 13 with each another. If high pressure is present in the working line 5 and low pressure in the working line 13, the valve 50 assumes the valve position 51, so that the working line 13 carrying low pressure is connected via the valve 50 and one of the two nonreturn valves 39 or 40 to the secondary circuit 3. If, conversely, high pressure is present in the second working line 13 and low pressure in the first working line 5, the valve 50 assumes the valve position 52, so that the first working line 5 carrying low pressure is connected via the valve 50 and one of the two nonreturn valves 39 and 40 to the secondary circuit 3. A direct connection to the feed line 33 is not necessary in the case of this embodiment.

Figure 3:
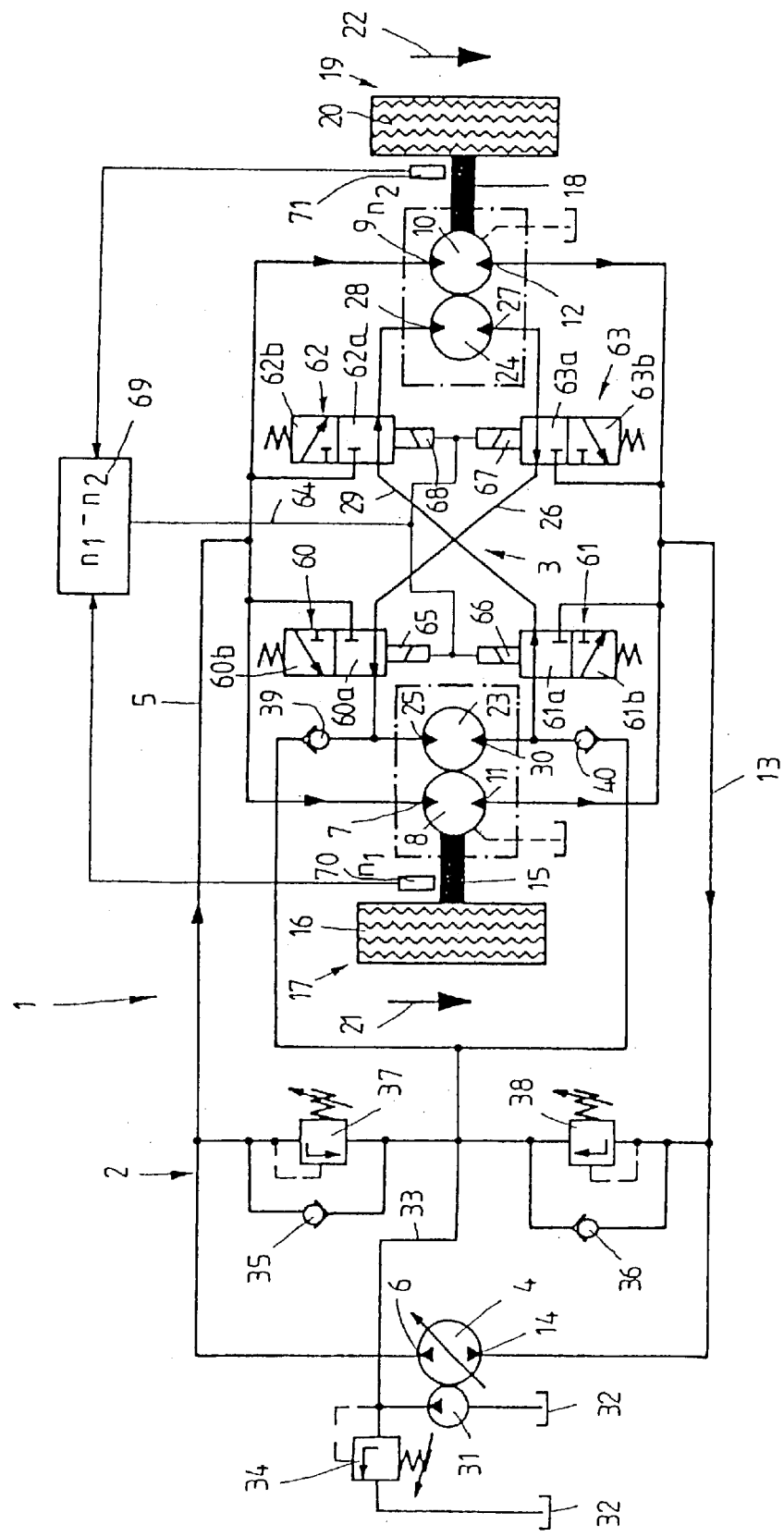
FIG. 3 shows a basic hydraulic and electrical circuit diagram of a third exemplary embodiment of the invention.

FIG. 3 shows a third exemplary embodiment of a hydrostatic drive according to the invention.

In contrast to the exemplary embodiment already described with reference to FIG. 1, in the case of the exemplary embodiment illustrated in FIG. 3 a first 3/2-way switching valve 60 and a fourth 3/2-way switching valve 63 are provided in the first secondary line 26 of the secondary circuit 3, whereas a second 3/2-way switching valve 61 and a third 3/2-way switching valve 62 are provided in the second secondary line 29 of the secondary circuit 3.

If the valves 60 to 63 are in their first valve position 60a, 61a, 62a and 63a illustrated in FIG. 3, the secondary circuit 3 is closed. The secondary circuit 3 works as described with reference to FIG. 1 to counteract a slip at one of the two drive trains 17 and 19. If, however, the valves 60 to 63 are in their other switching position 60b, 61b, 62b and 63b as the case may be, the first connection 25 of the third hydraulic motor 23 is connected to the first working line 5 and the second connection 30 of the third hydraulic motor 23 is connected to the second working line 13. Correspondingly, the first connection 27 of the fourth hydraulic motor 24 is then connected to the second working line 13 and the second connection 28 of the fourth hydraulic motor 24 to the first working line 5. The valves 60 to 63 are in the switching position 60b to 63b as long as no slip occurs at the drive trains 17 and 19. This has the advantage that for the first drive train 17 both the first hydraulic motor 8 and the third hydraulic motor 23 are available and for the second drive train 19 both the second hydraulic motor 10 and the fourth hydraulic motor 24 are available and thus the torque which can be generated is relatively high. If a slip occurs at one of the two drive trains 17 and 19, the valves 60 to 63 are switched over by a suitable control signal.

The valves 60 to 63 are driven in the exemplary embodiment illustrated in FIG. 3 via an electrical control signal which is supplied to electromagnets via an electrical control line 64. The electrical control signal is generated by a control device 69 which is connected to two speed sensors 70 and 71. The first speed sensor 70 determines the speed $n_1$ of the first output shaft 15. Correspondingly, the second speed sensor 71 determines the speed $n_2$ of the second output shaft 19. If the difference $n_1-n_2$ of the speeds $n_1$ and $n_2$ exceeds a preset threshold valve, this indicates a slip at one of the two drive trains 17 and 19. The valves 60 to 63 are then correspondingly switched over by the control device 69.

Figure 4:
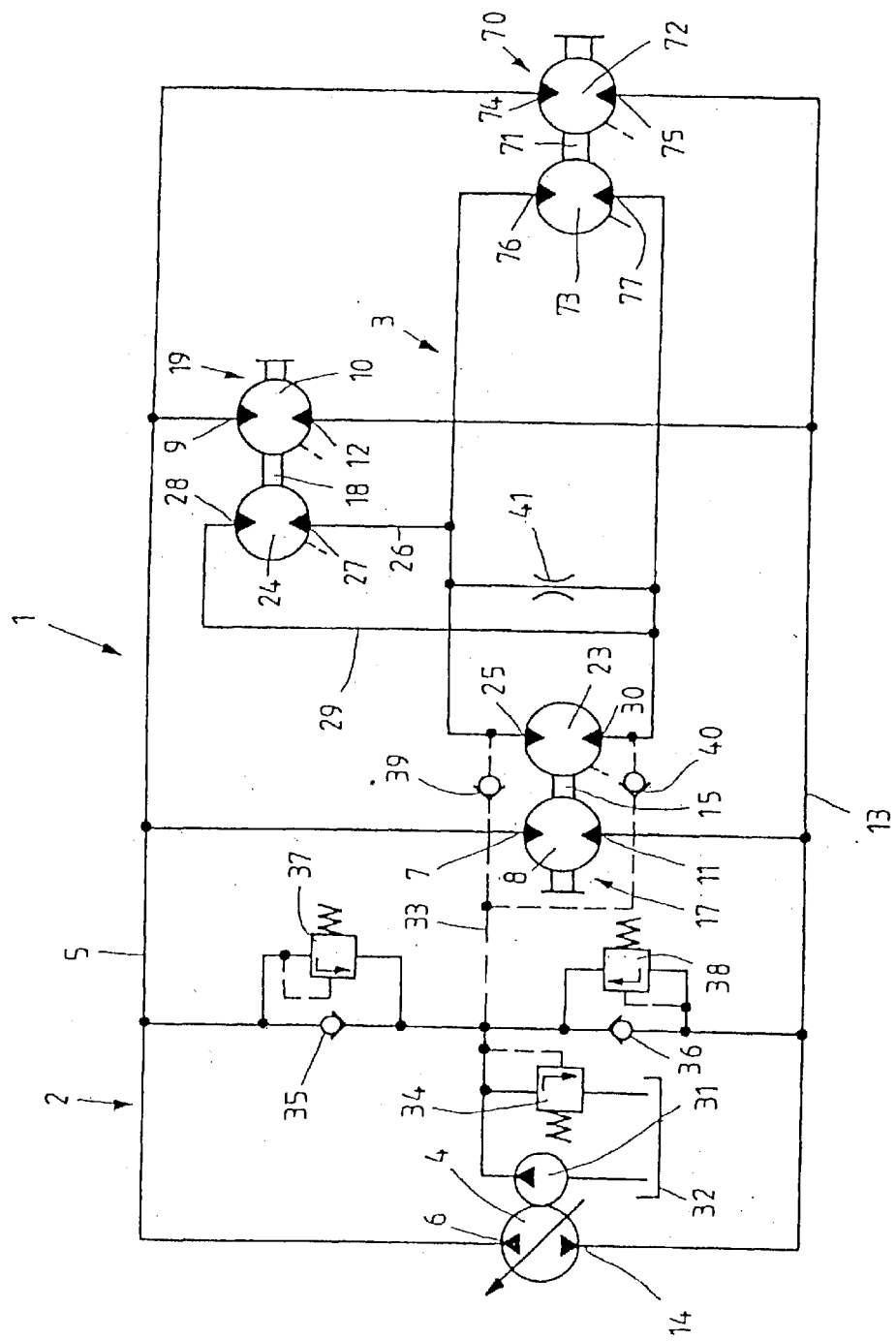
FIG. 4 shows a basic hydraulic circuit diagram of a fourth exemplary embodiment of the invention.

FIG. 4 shows a fourth exemplary embodiment of a hydrostatic drive 1 according to the invention, in which a third drive train 70 is provided in addition to the first drive train 17 and the second drive train 19. The three drive trains 17, 19 and 70 are used, for example, to drive three different vehicle wheels, which are not illustrated in FIG. 4. A fifth hydraulic motor 72 and a sixth hydraulic motor 73 are situated on an output shaft 71. A first connection 74 of the fifth hydraulic motor 72 is connected via the first working line 5 to the first connection 6 of the hydraulic pump 4. In contrast, a second connection 75 of the fifth hydraulic motor 72 is connected to the second connection 14 of the hydraulic pump 4. The first hydraulic motor 8, the second hydraulic motor 10 and the fifth hydraulic motor 72 are thus connected in parallel in the working circuit 2.

In contrast, the sixth hydraulic motor 73 is connected via the secondary circuit 3 to the third hydraulic motor 23 and the fourth hydraulic motor 24. For this purpose, a first connection 76 of the sixth hydraulic motor 73 is in connection via the first secondary line 26 of the secondary circuit 3 with the first connection 25 of the third hydraulic motor 23 and the first connection 27 of the fourth hydraulic motor 24. In contrast, a second connection 77 of the sixth hydraulic motor 73 is in connection via the secondary line 29 of the secondary circuit 3 with the second connection 30 of the third hydraulic motor 23 and the second connection 27 of the fourth hydraulic motor 24. The hydraulic motors 23, 24 and 73 are therefore coupled to one another via the secondary circuit 3 and, in the procedure already described, prevent a slip at the vehicle wheels driven via the drive trains 17, 19 and 70.

In the case of this exemplary embodiment, depending on the direction of rotation of the hydraulic motors 23, 24 and 73, one of the hydraulic motors 23, 24 or 73 must be designed in such a way that its absorbing volume is the same size as the sum of the absorbing volumes of the other two hydraulic motors. In the exemplary embodiment illustrated in FIG. 4, the fourth hydraulic motor 24 for example has an absorbing volume twice the size of that of the third hydraulic motor 23 and the sixth hydraulic motor 73.

In the exemplary embodiment illustrated in FIG. 4., there is once again provided a throttle 41 which permits a slight cross-flow between the first secondary line 26 and the second secondary line 29, so that the steering of the vehicle is facilitated. It is, however, also possible to dispense with the throttle 41 if a particularly rigid coupling of the drive trains 17, 19 and 70 is desired.

Figure 5:
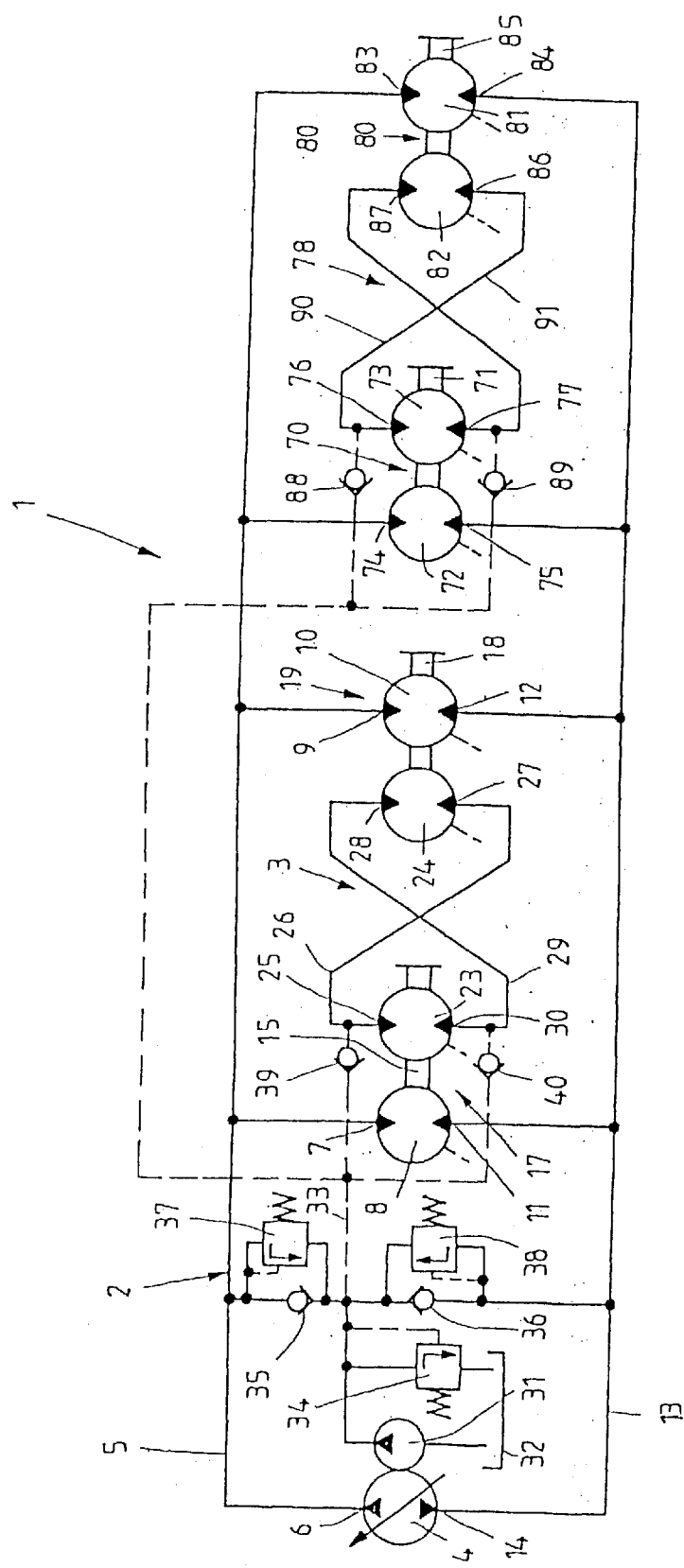
FIG. 5 shows a basic hydraulic circuit diagram of a fifth exemplary embodiment of the invention.

FIG. 5 shows an exemplary embodiment of a hydrostatic drive 1 according to the invention for driving four drive trains 17, 19, 70 and 80. The individual drive trains 17, 19, 70 and 80 drive different vehicle wheels for example. The first drive train 17 has the first hydraulic motor 8 and the third hydraulic motor 23, whereas the second drive train 19 has the second hydraulic motor 10 and the fourth hydraulic motor 24. Whereas the first hydraulic motor 8 and the second hydraulic motor 10 are connected to the working circuit 2 in the same way as illustrated in FIG. 1, the third hydraulic motor 23 and the fourth hydraulic motor 24 are connected to each other crosswise in the same way as illustrated in FIG. 1 via a first hydraulic secondary circuit 3. In a corresponding fashion, the third drive train 70 has a fifth hydraulic motor 72 connected to the working circuit 2 and a sixth hydraulic motor 73 arranged in a second secondary circuit 78. A first connection 74 of the fifth hydraulic motor 72 is in this case connected via the first working line 5 to the first connection 6 of the hydraulic pump 4, whereas a second connection 75 of the fifth hydraulic motor 72 is connected via the second working line 13 to the second connection 14 of the hydraulic pump 4.

The fourth drive train 80 has a seventh hydraulic motor 81 arranged in the working circuit 2 and an eighth hydraulic motor 82 arranged in the second secondary circuit 78. In this case, a first connection 83 of the seventh hydraulic motor 81 is connected via the first working line 5 to the first connection 6 of the hydraulic pump 4, whereas a second connection 84 of the seventh hydraulic motor 81 is in connection via the second working line 13 with the second connection 14 of the hydraulic pump 4. The seventh hydraulic motor 81 in this case drives an output shaft 85.

The connection of the sixth hydraulic motor 73 to the eighth hydraulic motor 82 is effected in a manner corresponding to the connection of the third hydraulic motor 23 to the fourth hydraulic motor 24, i.e. a first connection 76 of the sixth hydraulic motor 73 is connected to a first connection 86 of the eighth hydraulic motor 82, whereas a second connection 87 of the eighth hydraulic motor 82 is in connection with a second connection 77 of the sixth hydraulic motor 73. If the running direction of the hydraulic motors 23 and 24 on the one hand and 73 and 82 on the other hand is the same, the connections of these hydraulic motors connected crosswise in each case.

In the case of the exemplary embodiment illustrated in FIG. 5, the first secondary circuit 3 is completely separated from the second secondary circuit 78. The first drive train 17 and the second drive train 19 can drive for example the vehicle wheels of a first vehicle axle, whereas the third drive train 70 and the fourth drive train 80 drive the vehicle wheels of a second vehicle axle. A throttle 41, illustrated in FIG. 1, can be provided in each of the secondary circuits 3 and 78, in order to allow a slight slip for the purpose of facilitating the steering of the vehicle.

The feeding of the pressure fluid from the feed line 33 into the secondary circuit 78 is effected via two nonreturn valves 88 and 89.

Figure 6:
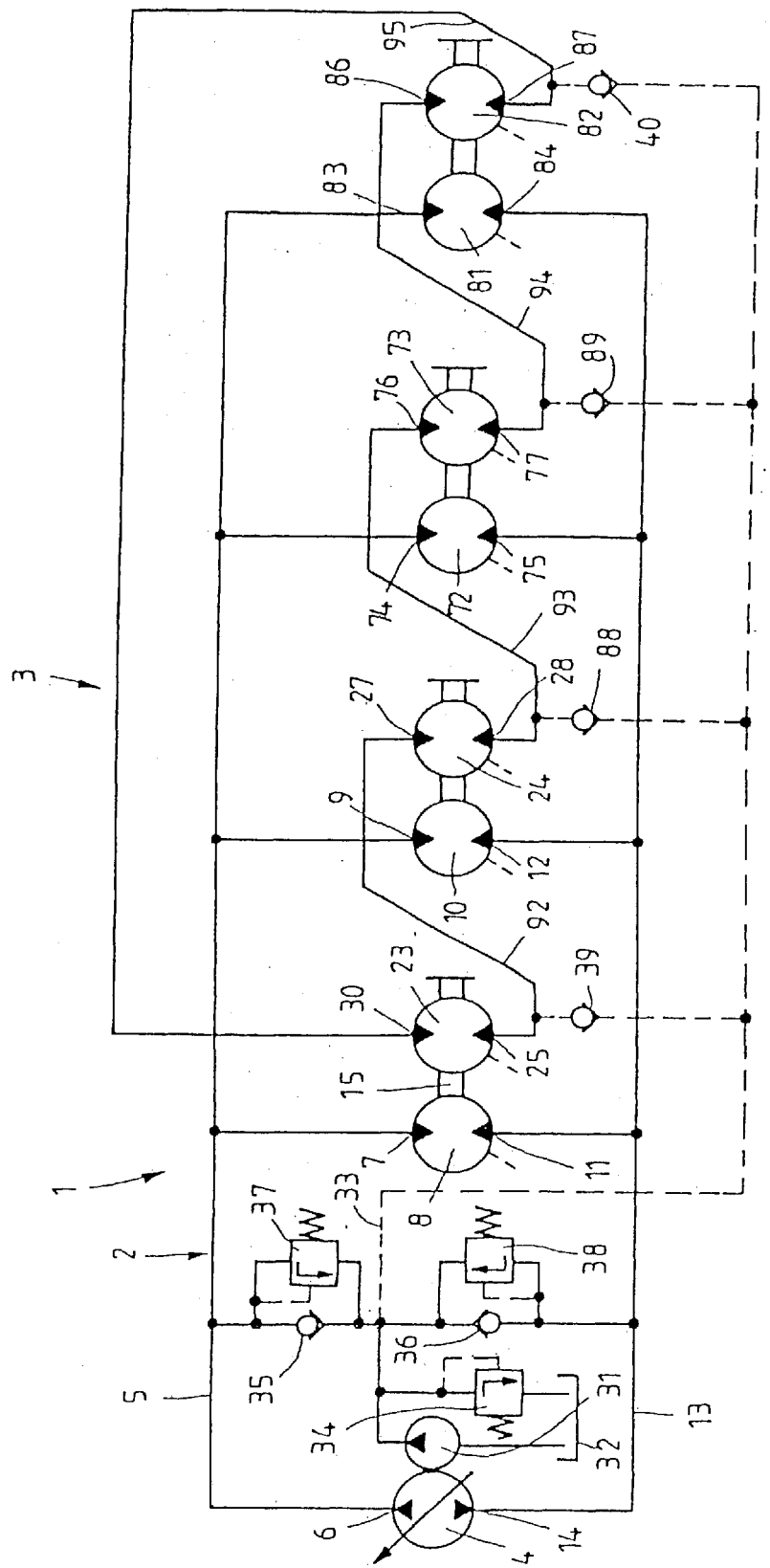
FIG. 6 shows a basic hydraulic circuit diagram of a sixth exemplary embodiment of the invention.

FIG. 6 shows another exemplary embodiment of a hydrostatic drive 1 according to the invention for driving four drive trains 17, 19, 70 and 80. Elements which have already been described with reference to FIG. 5 have been provided with the same reference symbols, so that repeated description in this respect is unnecessary.

In contrast to the exemplary embodiment illustrated in FIG. 5, in the exemplary embodiment illustrated in FIG. 6 the third hydraulic motor 23, the fourth hydraulic motor 24, the sixth hydraulic motor 73 and the eighth hydraulic motor 82 are not arranged, paired in series, in two separated secondary circuits but, altogether in series, in a single secondary circuit 3. For this purpose, the first connection 25 of the third hydraulic motor 23 is connected via a first secondary line 92 to the first connection 27 of the fourth hydraulic motor 24, the second connection 28 of the fourth hydraulic motor 24 is connected via a second secondary line 93 to the first connection 76 of the sixth hydraulic motor 73, the second connection 77 of the sixth hydraulic motor 73 is connected via a third secondary line 94 to the first connection 86 of the eighth hydraulic motor 82 and the second connection 87 of the eighth hydraulic motor 82 is connected via a fourth secondary line 95 to the second connection 30 of the third hydraulic motor 23.

For feeding pressure fluid, the first secondary line 92 is in connection with the feed line 33 via a nonreturn valve 39, the second secondary line 93 via a nonreturn valve 88, the third secondary line 94 via a nonreturn valve 89 and the fourth secondary line 95 via a nonreturn valve 40.

Whereas the exemplary embodiment illustrated in FIG. 5 only prevents a slip of vehicle wheels arranged in pairs, for example on a common vehicle axle, in the exemplary embodiment illustrated in FIG. 6 a slip of all the vehicle wheels is avoided in the manner of a four-wheel drive. It may be advantageous to provide a switching valve (not illustrated in the drawing) to be able to switch over between the circuit configuration illustrated in FIG. 5 and the circuit configuration illustrated in FIG. 6.

The invention is not restricted to the exemplary embodiments illustrated. The valves 60 to 63 can also be driven hydraulically instead of electrically. The measured quantity employed to detect a slip at one of the two drive trains 17 and 19 can also be the pressure drop at the first hydraulic motor 8 or the second hydraulic motor 10. Too small a pressure drop indicates an excessive speed of the hydraulic motor 8 or 10 and thus a slip at the respective drive train 17 or 19.

What is claimed is:

1. Hydrostatic drive (1) having
   at least one hydraulic pump (4),
   a first hydraulic motor (8) which is connected to the hydraulic pump (4) via a hydraulic working circuit (2) and drives a first drive train (17),
   a second hydraulic motor (10) which is connected via the hydraulic working circuit (2) to the hydraulic pump (4) and drives a second drive train (19),
   a third hydraulic motor (23) coupled to the first drive train (17), and
   a fourth hydraulic motor (24) coupled to the second drive train (19),
   characterised in that the fourth hydraulic motor (24) is connectable to the third hydraulic motor (23) via a hydraulic secondary circuit (3) independent of the working circuit (2), and
   a valve arrangement (60, 61) being provided, via which a first connection (25) of the third hydraulic motor (23) is selectively connectable to a first connection (27) of the fourth hydraulic motor (24) or to a first working line (5) and a second connection (30) of the third hydraulic motor (23) is selectively connectable to a second connection (28) of the fourth hydraulic motor (24) or to a second working line (13).

2. Hydrostatic drive according to claim 1, characterised in that a valve arrangement (62, 63) is provided, via which the second connection (28) of the fourth hydraulic motor (24) is selectively connectable to the second connection (30) of the third hydraulic motor (23) or to the first working line (5) and the first connection (27) of the fourth hydraulic motor (24) is selectively connectable to the first connection (25) of the third hydraulic motor (23) or to the second working line (13).

3. Hydrostatic drive according to claim 1, characterised in that at least one valve arrangement (60, 61; 62, 63) can be switched over by a control signal which is generated as a function of whether a slip occurs at one of the drive trains (17, 19).

4. Hydrostatic drive according to claim 3, characterised in that a first speed sensor (70 is arranged on the first drive train (17) and a second speed sensor (71) is arranged on the second drive train (19), and in that a control device (69) is provided which compares the speeds ($n_1$, $n_2$) determined by the speed sensors (70, 71) with each other, and switches over at least one valve arrangement (60, 61; 62, 63) as a function of the difference ($n_1-n_2$) of the speeds ($n_1$, $n_2$).

5. Hydrostatic drive according to claim 1, characterised in that a valve arrangement (60, 61) comprises a first switching valve (60) which selectively connects the first connection (25) of the third hydraulic motor (23) to the first connection (27) of the fourth hydraulic motor (24) or to the first working line (5), and a second switching valve (61) which selectively connects the second connection (30) of the third hydraulic motor (23) to the second connection (28) of the fourth hydraulic motor (24) or to the second working line (13).

6. Hydrostatic drive according to claim 1, characterized in that a valve arrangement (62, 63) comprises a third switching valve (62) which selectively connects the second connection (28) of the fourth hydraulic motor (24) to the second connection (30) of the third hydraulic motor (23) or to the first working line (5), and a fourth switching valve (63) which selectively connects the first connection (27) of the fourth hydraulic motor (24) to the first connection (25) of the third hydraulic motor (23) or to the second working line (13).

7. Hydrostatic drive (1) having
at least one hydraulic pump (4),
a first hydraulic motor (8) which is connected to the hydraulic pump (4) via a hydraulic working circuit (2) and drives a first drive train (17),
a second hydraulic motor (10) which is connected via the hydraulic working circuit (2) to the hydraulic pump (4) and drives a second drive train (19),
a third hydraulic motor (23) coupled to the first drive train (17),
a fourth hydraulic motor (24) coupled to the second drive train (19),
a hydraulic secondary circuit (3) with a first secondary line (26) connecting a first connection (25) of the third hydraulic motor (23) to a first connection (27) of the fourth hydraulic motor (24) and a second secondary line (29) connecting a second connection (28) of the fourth hydraulic motor (24) to a second connection (30) of the third hydraulic motor (23),
characterised in that the first secondary line (26) and the second secondary line (29) of the hydraulic secondary circuit (3) are in closed loop configuration, whereby one of said first and second lines has a braking pressure in the case of a slip of the first drive train (17) or of the second drive train (19).

8. Hydrostatic drive according to claim 7, characterised in that the secondary circuit (3) is connectable via a switching valve (50) to a low pressure-carrying working line (5; 13) of the working circuit (2) for feeding hydraulic fluid.

9. Hydrostatic drive according to claim 7, characterised in that the first hydraulic motor (8) and the third hydraulic motor (23) are arranged on a first common output shaft (15) and in that the second hydraulic motor (10) and the fourth hydraulic motor (24) are arranged on a second common output shaft (18).

10. Hydrostatic drive according to claim 7, characterised in that the first secondary line (26) is connected to the second secondary line (29) of the secondary circuit (3) via a throttle (41).

11. Hydrostatic drive according to claim 7, characterised in that a first connection (7) of the first hydraulic motor (8) and a first connection (9) of the second hydraulic motor (10) are connected via a first working line (5) of the working circuit (2) to a first connection (6) of the hydraulic pump (4), in that a second connection (11) of the first hydraulic motor (8) and a second connection (12) of the second hydraulic motor (10) are connected via a second working line (13) of the working circuit (2) to a second connection (14) of the hydraulic pump (4).

12. Hydrostatic drive (1) having
at least one hydraulic pump (4),
a first hydraulic motor (8) which is connected to the hydraulic pump (4) via a hydraulic working circuit (2) and drives a first drive train (17),
a second hydraulic motor (10) which is connected via the hydraulic working circuit (2) to the hydraulic pump (4) and drives a second drive train (19),
a third hydraulic motor (23) coupled to the first drive train (17),
a fourth hydraulic motor (24) coupled to the second drive train (19), characterised in that the fourth hydraulic motor (24) is connectable to the third hydraulic motor (23) via a hydraulic secondary circuit (3) independent of the working circuit (2), and a fifth hydraulic motor (72) being provided which is connected to the hydraulic pump (4) via the hydraulic working circuit (2) and drives a third drive train (71) and a sixth hydraulic motor (73) being provided coupled to the third the drive train (71) the sixth hydraulic motor (73) being connectable to the third hydraulic motor (24) via the hydraulic secondary circuit (3).

13. Hydrostatic drive according to claim 12, characterised in that a first connection (76) of the sixth hydraulic motor (73) is connected via a first secondary line (26) of the secondary circuit (3) to a first connection (25) of the third hydraulic motor (23) and a first connection (27) of the fourth hydraulic motor (24), and in that a second connection (77) of the sixth hydraulic motor (73) is connected via a second secondary line (29) of the secondary circuit (3) to a second connection (30) of the third hydraulic motor (23) and a second connection (27) of the fourth hydraulic motor (24).

14. Hydrostatic drive according to claim 12, characterised in that, of the third hydraulic motor (23), the fourth hydraulic motor (24) and the sixth hydraulic motor (73), a hydraulic motor (24) has an absorbing volume which corresponds to the sum of the absorbing volumes of the other two hydraulic motors (23, 73).

15. Hydrostatic drive according to claim 12, characterised in that a seventh hydraulic motor (81) which is connected to the hydraulic pump (4) via the hydraulic working circuit (2) and drives a fourth drive train (80) is provided, and an eighth hydraulic motor (82) coupled to the fourth drive train (80) is provided.

16. Hydrostatic drive according to claim 15, characterised in that the third hydraulic motor (23), the fourth hydraulic motor (24), the sixth hydraulic motor (73) and the eighth hydraulic motor (82) are connected to one another in series via a single secondary circuit (3).

17. Hydrostatic drive according to claim 16, characterised in that a first connection (25) of the third hydraulic motor (23) is connected to a first connection (27) of the fourth hydraulic motor (24), in that a second connection (28) of the fourth hydraulic motor (24) is connected to a first connection (76) of the sixth hydraulic motor (73), in that a second connection (77) of the sixth hydraulic motor (73) is connected to a first connection (86) of the eighth hydraulic motor (82), and in that a second connection (87) of the eighth hydraulic motor (82) is connected to a second connection (30) of the third hydraulic motor (23).

18. Hydrostatic drive according to claim 15, characterised in that the third hydraulic motor (23) is connected to the fourth hydraulic motor (24) via a first secondary circuit (3), and in that the sixth hydraulic motor (73) is connected to the eighth hydraulic motor (82) via a second secondary circuit (78).

19. Hydrostatic drive (1) having
at least one hydraulic pump (4),
a first hydraulic motor (8) which is connected to the hydraulic pump (4) via a hydraulic working circuit (2) and drives a first drive train (17),
a second hydraulic motor (10) which is connected via the hydraulic working circuit (2) to the hydraulic pump (4) and drives a second drive train (19),
a third hydraulic motor (23) coupled to the first drive train (17),
a fourth hydraulic motor (24) coupled to the second drive train (19),
characterised in that the fourth hydraulic motor (24) is connectable to the third hydraulic motor (23) via a hydraulic secondary circuit (3) independent of the working circuit (2), the secondary circuit (3) being connected to a feed line (33) for feeding hydraulic fluid, and a low pressure-carrying secondary line (26; 29) of the secondary circuit (3) is connected via a nonreturn valve (39; 40) to the feed line (33) or the switching valve (50).

* * * * *